May 26, 1942.  D. G. ZANK  2,284,352
SEAT
Filed May 26, 1941  2 Sheets-Sheet 1

Inventor
Donald G. Zank,

May 26, 1942.   D. G. ZANK   2,284,352
SEAT
Filed May 26, 1941   2 Sheets-Sheet 2
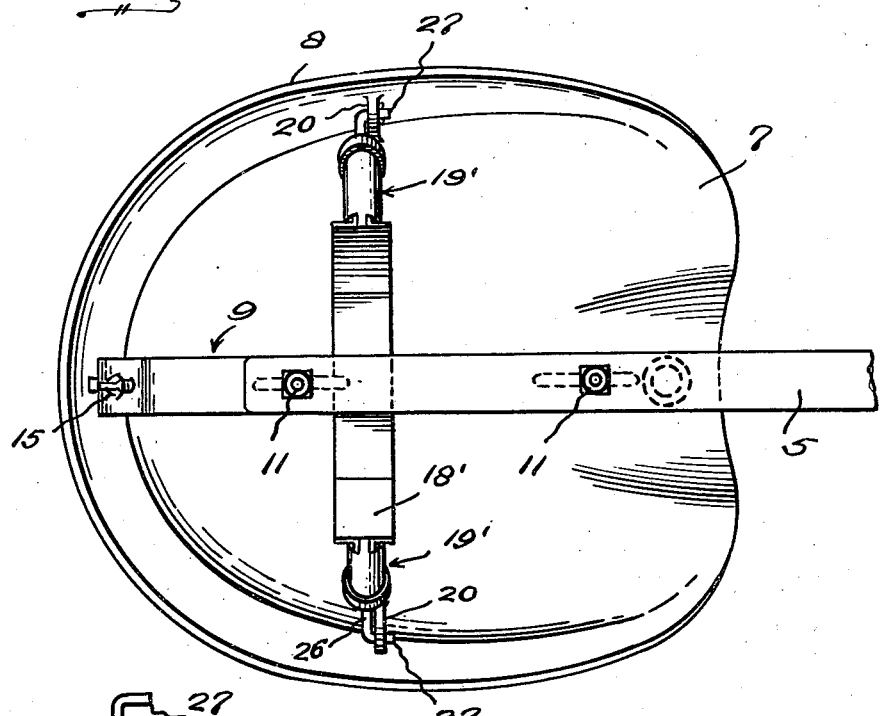
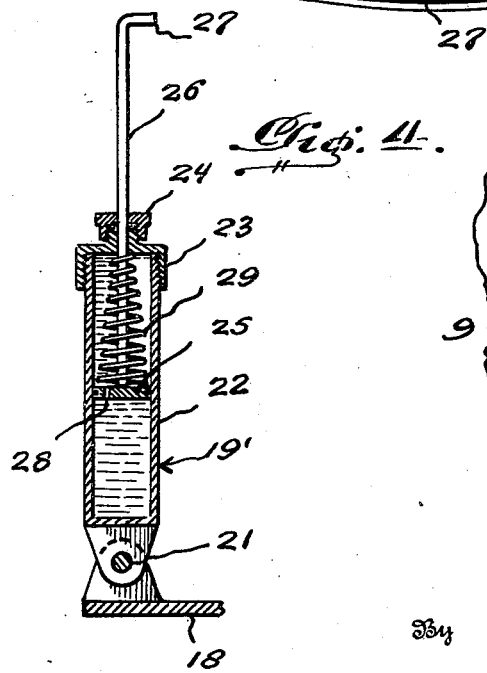
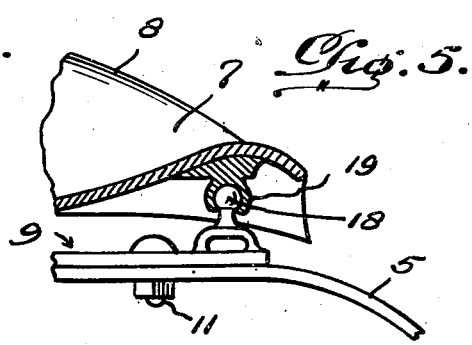
Inventor
Donald G. Zank,
By McMorrow & Berman
Attorneys Patented May 26, 1942

2,284,352

UNITED STATES PATENT OFFICE 2,284,352

SEAT

Donald G. Zank, West Salem, Wis.

Application May 26, 1941, Serial No. 395,287

3 Claims. (Cl. 155—121)

This invention relates to seats for powered farm implements, tractors and the like and more particularly to a mounting for a seat of the kind specified, and has for the primary object the provision of a device of the above stated character which besides absorbing shocks will automatically sustain the seat level when under the weight of the operator and the farm implement or tractor tilting sideways in either direction, as when operating on the side of a hill or with one of the traction wheels thereof in a furrow and the opposite traction wheel on unplowed ground, consequently rendering the operation of the farm implement or tractor less tiring to the operator by relieving back strain and the effort of the operator trying to maintain a perpendicular seated position under the stated operating conditions of the farm implement or tractor.

Another object of this invention is the provision of a device of the above stated character which may be used in connection with the standard type of seats and spring seat posts found on devices of the kind stated and will permit the seat to be adjusted rearwardly and forwardly on the post and is of a construction which will be economical to manufacture, compact, durable and easily kept in proper operating condition, and may be quickly rendered inoperative for levelling purposes or render the seat rigid as far as having relative movement to the mounting when desired.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a fragmentary side elevation partly in section illustrating a conventional type of seat post and seat mounted thereon in accordance with my invention.

Figure 3 is a bottom plan view illustrating the device.

Figure 4 is a vertical sectional view illustrating one of the stabilizers.

Figure 5 is a fragmentary side elevation partly in section illustrating the front pivot of the seat.

Figure 1:
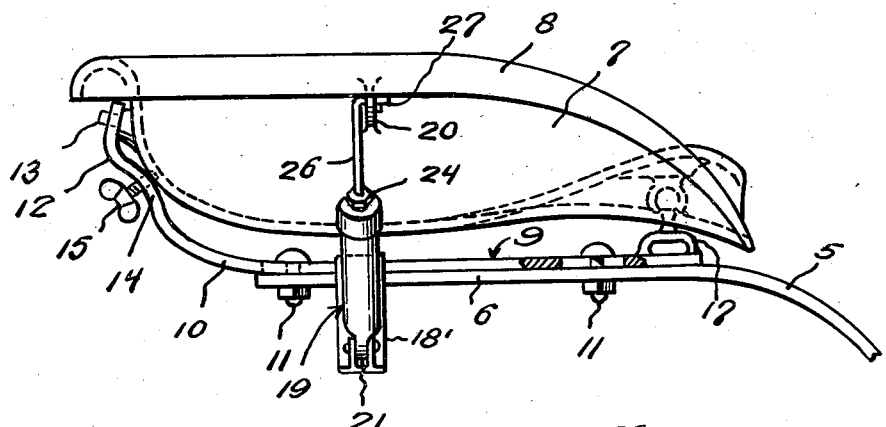
Figure 2:
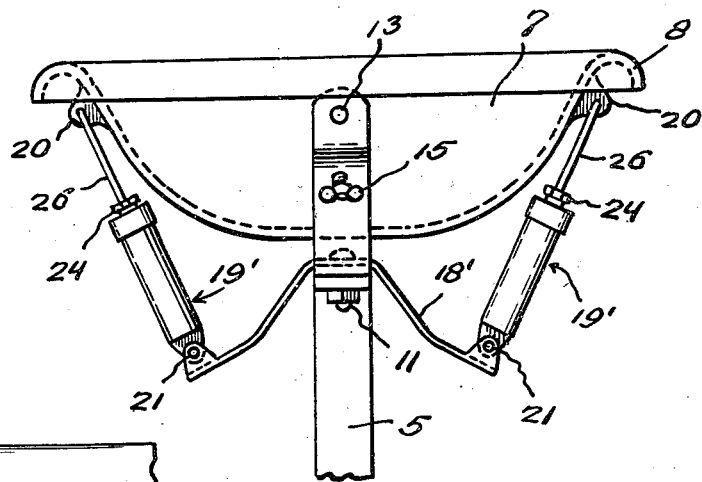
Figure 2 is a rear elevation illustrating the same.
Figure 6:
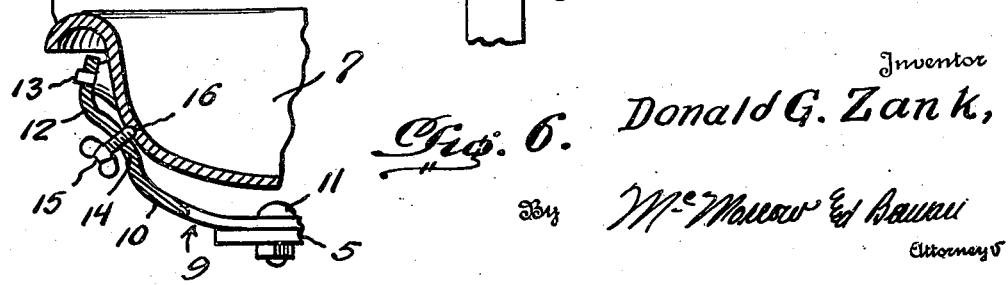
Figure 6 is a fragmentary vertical sectional view illustrating the rear pivot of the seat and the means of rendering the seat rigid on the mounting when desired.

Referring in detail to the drawings, the numeral 5 indicates a conventional type of spring seat supporting post found on powered farm implements, tractors and the like and which includes a horizontal portion 6 located directly under a conventional type of seat 7. When stating the seat is conventional it is to be understood that it is of the bucket type having rolled edges 8.

A cradle 9 for the mounting of the seat 7 on the post 5 includes a metallic member 10 having a horizontal portion resting flatly upon the horizontal portion 6 of the post 5 and paralleling said horizontal portion 6 and adjustably connected thereto by bolts 11 whereby the seat may be adjusted forwardly and rearwardly on the post 5. The metallic member 10 further includes an upwardly curved portion 12 having an apertured extremity to rotatably receive a pintle 13 formed on the rear wall of the seat 7. The curved portion 12 is offset, as shown at 14, and provided with a screw threaded opening to receive a set screw 15 which may be turned into a socket 16 formed in the rear wall of the seat 7 when desiring to lock the seat to the mounting against pivotal movement.

A bracket 17 is formed on the horizontal portion of the member 9 and has integral therewith a ball 18 fitting in a socket 19 formed on the under face of the seat adjacent the forward edge thereof. The ball and socket 19 permits free pivotal movement of the forward end of the seat on the mounting 9 and with the pintle 13 fitting in the opening of the member 10 will allow the seat to tilt sideways in either direction when the set screw 15 is disengaged from the socket 16.

Mounted on and arranged transversely of the member 9 and substantially midway between the forward and rear edges of the seat is an inverted substantially U-shaped spring member 18' acting as a cushion support for stabilizers 19' pivotally connected to ears 20 formed on opposite sides of the seat 7. The stabilizers are pivotally connected to the spring support, as shown at 21, and each includes a cylinder 22 having a removable cap 23 at one end equipped with a stuffing gland 24.

A ported piston 25 operates in the cylinder 22 and the stem 26 thereof extends through the stuffing gland 24 and has an angularly related end 27 extending through the opening of the ear 20 and apertured to receive a cotter key or like fastener. The port in the piston is indicated by the character 28 and is of such size as to gradually permit fluid which fills the cylinder to pass the piston governing the rapidity in which the piston may move from end to end of the cylinder.

An expansion coil type spring 29 is mounted on the stem 26 and bears against the cap 23 and the piston. Thus it will be seen that the stabilizers are of the hydraulic type and function to normally sustain the seat level when the farm implement or tractor on which the seat is installed is operating on an incline or a side of a hill, that is, when the seat is under the weight of the operator.

The stabilizers acting as specified relieve the operator of immense back strain caused by an effort on the part of the operator to maintain a perpendicular seated position when riding upon seats of the conventional construction.

The springs 29 of the stabilizers act to restore the seat to normal position as the tractor or farm implement returns to a level position. The spring member 18' besides supporting the stabilizers on the mounting 9 also acts to absorb side shocks to the seat and will permit all changes in position of the seat to more gradually come about under the influence of the stabilizers.

The use of this type of mounting will lend itself readily applicable to farm implements or tractor seats and their supporting posts and will render the operation of such devices less tiring to the operator as all back strain is substantially eliminated as well as providing comfortable riding by absorbing shocks and jars. At any time the operator may desire to discontinue the levelling feature of the seat it is only necessary to turn the set screw 15 into the socket 16 of the seat.

While I have shown and described the preferred embodiment of my invention, it will be understood that minor changes in construction, combination and arrangement of parts may be made without departing from the spirit and scope of the invention as claimed.

Having thus described the invention, what I claim is:

1. In a seat mounting, a seat post, a cradle member on said post, a seat, pivotal connections between the seat and cradle member whereby the seat may tilt sideways in either direction, an inverted substantially U-shaped spring member carried by said cradle member and arranged transversely thereof, and hydraulic stabilizers pivotally mounted on said spring member and pivotally and detachably connected to opposite sides of the seat for levelling the latter.

2. In a seat mounting, a seat post, a cradle member on said post, a seat, pivotal connections between the seat and cradle member whereby the seat may tilt sideways in either dirction, an inverted substantially U-shaped spring member carried by said cradle member and arranged transversely thereof, hydraulic stabilizers pivotally mounted on said spring member and pivotally and detachably connected to opposite sides of the seat for levelling the latter, and a set screw carried by the cradle member to engage with the seat to render the latter rigid as to relative movement between itself and the cradle member.

3. In a seat mounting, a cradle member adjustably mounted on a seat post, a seat arranged above the cradle member, pivots connecting the seat to the cradle member whereby said seat may tilt sideways in either direction, a spring member secured on said cradle member and extending transversely thereof, hydraulic stabilizers pivotally connected to opposite sides of the seat and to said spring member and each including a fluid cylinder pivoted on said spring member and a ported piston operating in the cylinder with the stem thereof pivoted to the seat, and an expansion spring acting on the piston in one direction.

DONALD G. ZANK.

Patent No. 2,284,352  Granted May 26, 1942
DONALD G. ZANK

The above entitled patent was extended June 26, 1951, under the provisions of the Act of June 30, 1950, for 4 years and 47 days, from the expiration of the original term thereof.

*Commissioner of Patents.*